(12) United States Patent
Mori (10) Patent No.: US 6,219,689 B1
(45) Date of Patent: Apr. 17, 2001

(54) PARALLEL TRANSACTION PROCESSING SYSTEM

(75) Inventor: Shigeko Mori, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/132,332

(22) Filed: Aug. 12, 1998

(51) Int. Cl.$^7$ ...................................................... G06F 9/00
(52) U.S. Cl. ........................... 709/101; 709/100; 707/202
(58) Field of Search .................... 709/100, 101, 709/102, 103, 104; 707/201, 202, 203, 204, 104, 3, 4; 714/19, 20

(56) References Cited

U.S. PATENT DOCUMENTS

| | | | |
|---|---|---|---|
| 4,949,251 | * 8/1990 | Griffin et al. | 714/20 |
| 5,455,944 | * 10/1995 | Haderle et al. | 707/202 |
| 5,561,795 | * 10/1996 | Sarkar | 707/202 |
| 5,701,457 | * 12/1997 | Fujiwara | 707/8 |
| 5,916,307 | * 6/1999 | Piskiel | 709/314 |
| 5,956,489 | * 9/1999 | San Andres et al. | 709/221 |
| 6,052,695 | * 4/2000 | Abe et al. | 707/202 |
| 6,122,642 | * 9/2000 | Mekovic | 707/104 |

* cited by examiner

Primary Examiner—Majid Banankhah
(74) Attorney, Agent, or Firm—Ronald L. Drumheller (57) ABSTRACT

A parallel transaction processing system performs efficient parallel processing of multiple tasks and includes a queue for storing a plurality of transaction data which can be processed independently, a control table containing control information for the queue and means for operating a plurality of tasks which performs the same processing on the transaction data stored in the queue. A corresponding parallel transaction processing method includes the steps of: storing a plurality of transaction data in a queue which can be processed independently, providing a control table containing control information for the queue, and operating a plurality of tasks which perform the same processing on the transaction data stored in the queue. Each of the operated tasks reserves a predetermined number of consecutive transaction data for processing among unprocessed transaction data stored in the queue by referencing the control table, writes its reservation status in the control table and, upon having processed the reserved transaction data, writes its processing status in the control table.

10 Claims, 6 Drawing Sheets

PARALLEL TRANSACTION PROCESSING SYSTEM

BACKGROUND OF THE INVENTION

1. Field of the Invention

This invention relates to a parallel transaction processing system and, in particular, to a system and a method for efficiently processing transaction data stored in a queue by having a plurality of tasks operate independently in parallel.

2. Related Art

A prior art on-line transaction processing system was so configured that it was provided with one or more queues in the system and transaction data stored in the queues were processed one after the other by a single task or multiple tasks (sequentially or independently). For example, Japanese Published Unexamined Patent Application 1-216434 discloses a multitask control system for transaction processing which, upon occurrence of a fault, is capable of automatically taking over a process running before the occurrence of the fault. This multitask control system is characterized in that a check point file is provided for check point control in addition to a terminal control table, but does not describe control of a queue. Also, a system is known in which transaction data such as transaction log stored in a queue are processed sequentially one after the other by a single task.

There was a limit in improving the number of transaction data processings per unit time in the prior art system in which transaction data were sequentially processed by a single task. While a parallel processing by multiple tasks may be considered as a technique to solve this problem, there is a problem as to how efficiently a lot of transaction data stored in a single queue could be processed.

In addition, in order to operate a prior art transaction processing system between different CECs on a sysplex, it was necessary to additionally provide a special component such as Intersystem Extended Service (XES) of MVS, for example. Further, transaction data, once stored in a queue, had to be scheduled for task processing and can not be canceled by a user in any prior art of multitask and single task.

SUMMARY OF THE INVENTION

Accordingly, it is an object of this invention to provide a parallel transaction processing system and method which can improve the processing speed by an efficient parallel processing of multiple tasks.

It is another object of this invention to provide a parallel transaction processing system and method in which transactions can be processed in the same way both in the sysplex and non-sysplex environments.

It is a further object of this invention to provide a parallel transaction processing system and method which can cancel processing of transaction data stored in a queue by an indication from a user upon occurrence of a fault.

The parallel transaction processing system according to this invention comprises a queue for storing a plurality of transaction data which can be processed independently, a control table containing control information for the queue and means for operating a plurality of tasks each of which performs the same processing on the transaction data stored in the queue. Each of the plurality of operated tasks reserves by referencing the control table a predetermined number of consecutive transaction data for processing among the unprocessed transaction data stored in the queue, writes its reservation status in the control table and, upon having processed the reserved transaction data, writes its processing status in the control table.

Further, the parallel transaction processing method according to this invention comprises the steps of storing a plurality of transaction data which can be processed independently, providing a control table containing control information for the queue, and operating a plurality of tasks each of which performs the same processing on the transaction data stored in the queue. Each of the plurality of operated tasks reserves by referencing the control table a predetermined number of consecutive transaction data for processing among the unprocessed transaction data stored in the queue, writes its reservation status in the control table and, upon having processed the reserved transaction data, writes its processing status in the control table.

In one embodiment of this invention, a queue storing transaction data identifies the transaction data by serially numbered unique key values. The control table holds first information indicating up to which point the transaction data are stored in the queue, second information indicating up to which one of a plurality of transaction data stored in the queue have been reserved for processing, and third information indicating the reservation and processing statuses of each task.

DESCRIPTION OF THE PREFERRED EMBODIMENTS

The preferred embodiments of this invention are now described with reference to the drawings.

Figure 1:
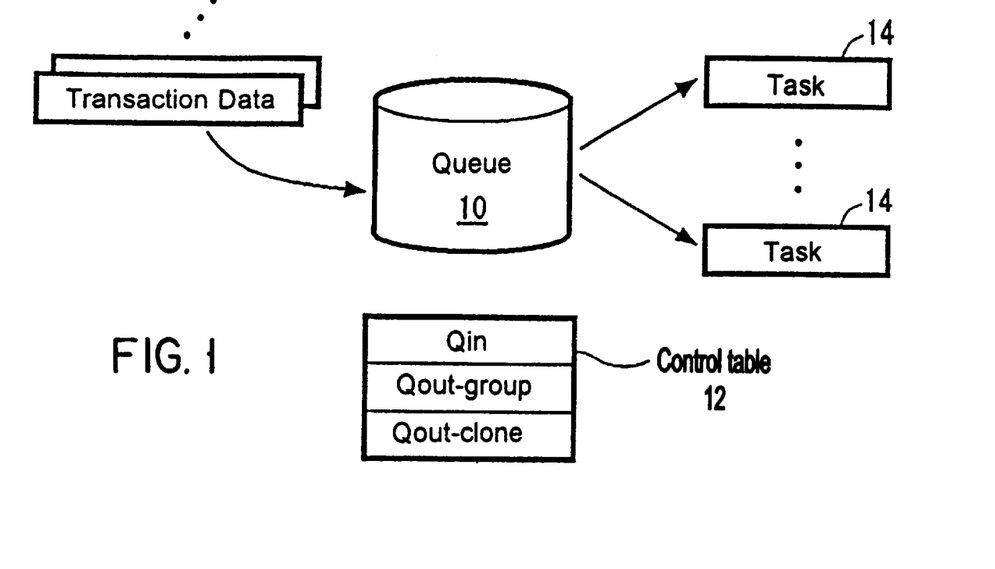
FIG. 1 is a diagram showing an outline of the parallel transaction processing system according to this invention.

An outline of the parallel transaction processing system according to this invention is shown in FIG. 1. The system comprises a queue 10 for storing a lot of transaction data which can be independently processed, a control table 12 containing information for controlling write (queue-in) and read (queue-out) of the queue, and a plurality of same tasks (clones) 14 for processing the transaction data stored in the queue 10. Each of the queue 10 and the control table 12 is a database. The transaction data are created by a transaction generating task which is separate from the transaction data processing tasks 14, and written in the queue 10.

The control table 12 holds three kinds of control information. The first control information (referred to as Qin information) indicates up to which point the transaction data are stored in the queue 10, the second control information (referred to as Qout-group information) indicates up to which one of a plurality of transaction data stored in the queue 10 have been reserved for processing, and the third control information (referred to as Qout-clone information) indicates the reservation and processing statuses of each task. In this embodiment, the Qin information is held in a first database while the Qout-group information and the Qout-clone information are held in a second database which is separate from the first database.

Figure 2:
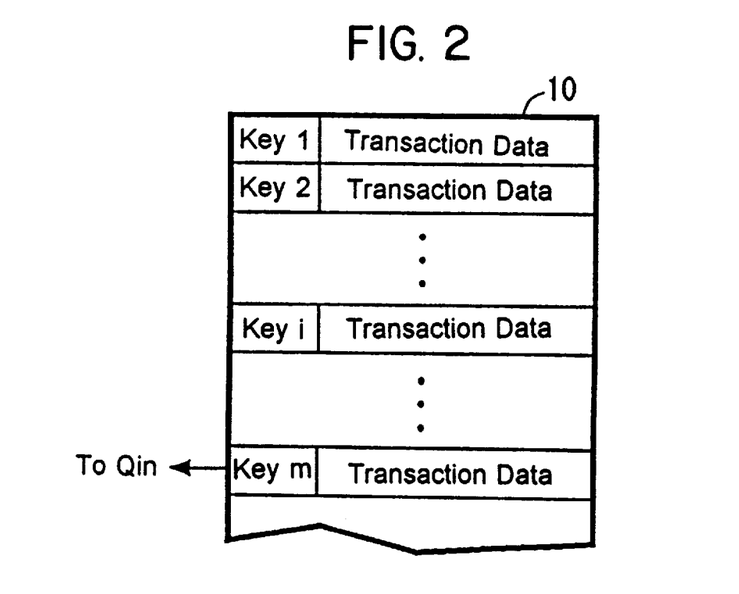
FIG. 2 shows a structure of a queue storing a lot of transaction data.

The content of the queue 10 is shown in FIG. 2. As shown in FIG. 2, each of the transaction data stored in the queue 10 is identified by a serially numbered unique key value i (i=1, 2, ...). The above described transaction generating task writes transaction data sequentially starting from key 1 and writes a key value m which was written last, in the control table 10 as Qin information.

Figure 3:
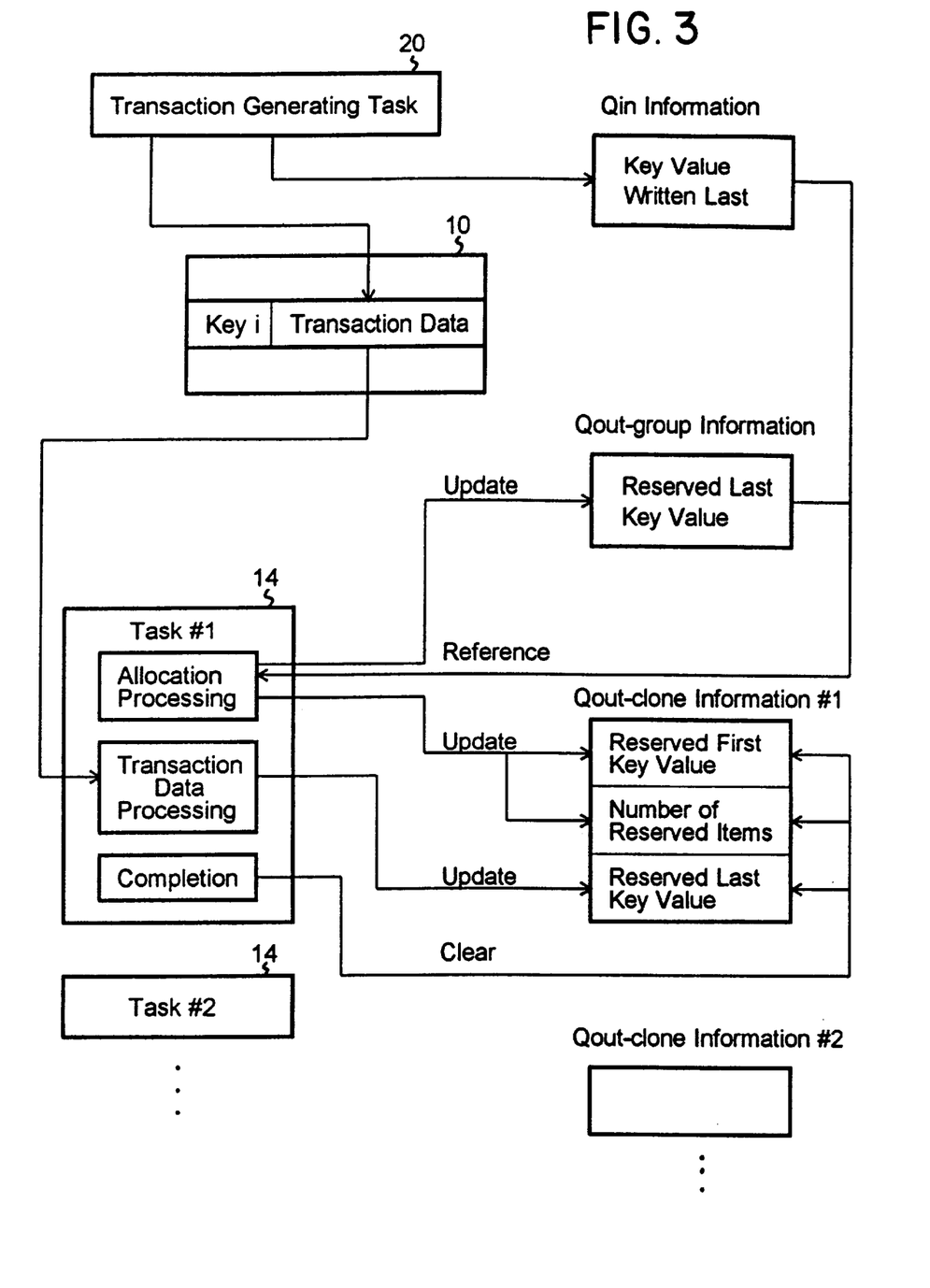
FIG. 3 is a block diagram illustrating the operation of the parallel transaction processing system according to this invention.

With reference to FIG. 3, the operation of the parallel transaction processing system of this invention is now described, starting from queue-in of transaction data.

Queue-in of Transaction Data

Transaction data are created by a transaction generating task 20 and written in the queue 10 as described above. The transaction generating task 20 updates the Qin information with a key value written last and performs sync point processing by a well known one-phase commit or two-phase commit, and then terminates.

Task Generation

The tasks 14 are generated simultaneously by a start command. The number of generated tasks may be varied depending on the need. The task generation may be done either before or after the transaction data are stored in the queue 10. The generated task 14 has a characteristic of a clone which invokes the same program from a program library (not shown) and performs processing in the same manner.

Allocation of Transaction Data to Each Task

Each task 14 reserves first n of unprocessed transaction data stored in the queue 10 to process them by itself by referencing the control information, particularly, the Qin information and the Qout-group information of the control table 12. This reservation is made by specifying the key values identifying the first and last transaction data to be processed, respectively. It should be noted that the reservations by the respective tasks are serialized to prevent two or more tasks from processing the same transaction data. In other words, when one task performs the allocation processing for reservation, the Qout-group information is locked to prevent any other task from accessing it. When the allocation processing is completed, the lock is released and other tasks become able to reserve.

A task which performed the allocation processing, e.g. task #1, writes the last key value of the reserved transaction data in the Qout-group information, writes the first key value and the number of reserved data in its own Qout-clone information, and performs a sync point processing. While the number of transaction data reserved by each task is assumed to be ten for the purpose of explanation in this embodiment, this invention is not limited to such number. Also, the reservation number may be changed depending on the amount of the transaction data stored in the queue 10. Additionally, the Qout-group information includes a residue flag for each task beside the reserved last key value. This will be described later in this specification.

Transaction Data Processing

The task #1 which has completed the allocation retrieves the reserved transaction data sequentially from the queue 10 by designating the key values sequentially from the first key value based on its own Qout-clone information #1 for processing the transaction data one by one. Since the task #1 does not reference the Qin information and the Qout-group information during the transaction data processing, another task can perform the above described allocation. The task #1, upon completion of processing of one item, writes a key value corresponding to the processed transaction data in the Qout-clone information #1 in the sync point processing. The sync point processing may be performed for every multiple items. By doing so, the processing speed can be improved over the case of sync point processing performed for every one item.

The task #1, upon completing the processing of all reserved transaction data, clears the contents of its own Qout-clone information and performs a sync point processing. Thus, all transaction data reserved by the task #1 become "processed". The task #1 then performs another allocation processing.

The remaining tasks also perform similar allocation processing and transaction data processing. Since each of the tasks independently performs transaction data processing after the allocation, the processing speed is improved by such parallel processing. Since each task 14 is a peer task (clone) which performs the same processing as described above, any priority in retrieving the transaction data from the queue 10 is not established. Therefore, each task retrieves the transaction data from the queue 10 on the first come first served basis. Even such an access method does not present any problem since, in fact, it does not happen practically that a plurality of tasks access the queue exactly at the same time.

Termination of a task is next explained with reference to FIG. 4. A task is terminated by a command as it was started. A terminate command terminates a task with either a normal termination or immediate termination. The normal termination terminates all tasks 14 associated with the queue 10 when all transaction data reserved by the respective tasks 14 have been successfully processed, there remains no unprocessed transaction data in the queue 10 and the transaction generating task 20 does not store new transaction data in the queue 10. On the other hand, the immediate termination writes a key value of transaction data processed by a specified task in the corresponding Qout-clone information, performs the sync point processing and terminates the task as soon as the transaction data processing currently executed by the task is completed.

In case of the immediate termination, transaction data which have been reserved but not yet been processed may remain in the queue 10 and that status has to be indicated. To this end, the Qout-group information includes a residue flag for each task in addition to the reserved last key value as shown in FIG. 4. If unprocessed transaction data reserved by a certain task remains when the task is instructed to immediately terminate, a residue flag corresponding to that task is set.

Figure 4:
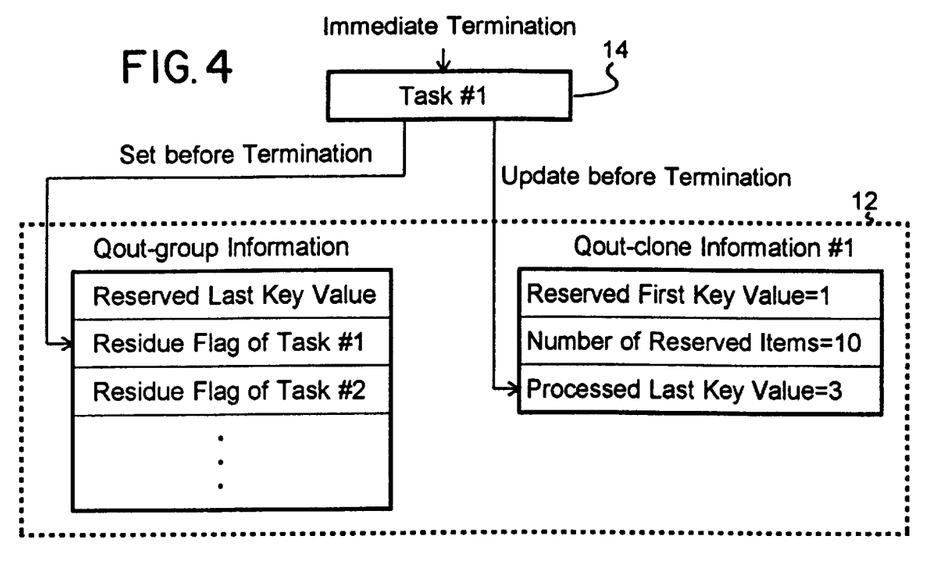
FIG. 4 is a block diagram showing the operation at the time of immediate task termination in the parallel transaction processing system according to this invention.

FIG. 4 shows an example where the task #1 which has reserved ten items of transaction data from key 1 to key 10 is immediately terminated at the time when it completes transaction data processing for key 3. Since seven items of unprocessed transaction data remain in this case, the residue flag of the task #1 is set in the last sync point processing.

The remaining unprocessed transaction data are processed by another task. Therefore, when an operating task references the Qout-group information in the above described allocation processing, it determines whether or not any residue flag is set before reserving transaction data. For example, it is assumed that the task #2 starts allocation processing after the task #1 immediately terminates with the status of FIG. 4. When the task #2 finds in the examination of the Qout-group information that the residue flag of the task #1 is set, it copies the Qout-clone information of the task #1 to its own Qout-clone information, resets the residue flag of the task #1, and clears the Qout-clone information of the task #1. The task #2 then sequentially processes the transaction data from key 4 to key 10 based on the reservation information copied to its own Qout-clone information, including reserved first key value=1, number of reserved items=10, and processed last key value=3. Transfer of control for processing the transaction data from the task #1 to the task #2 is automatically done and is transparent to the user. The user needs to know nothing about the existence of reserved, unprocessed transaction data remaining after the immediate termination.

If a fault occurs during transaction data processing, it causes an abnormal termination in which no residue flag is set unlike the termination by the terminate command. Therefore, any task will not automatically take over the processing of the reserved, unprocessed transaction data. However, since the processed last key value is held by the sync point processing in the Qout-clone information of a task which caused the fault, processing may be resumed from the transaction data identified by a key value next to the last key value by restarting the task after recovery from the fault. Accordingly, duplication and/or skipping of transaction data processing will not take place.

If it is not desired to have the transaction data which caused the fault processed after the task is restarted, it is possible to avoid its processing by a skip command to resume processing from the next transaction data. To this end, it is necessary to precisely know the transaction data which was being processed when the fault occurred. If a sync point processing is performed each time one item of transaction data is processed, it could be determined that the fault occurred on the transaction data corresponding to the key value next to the processed last key value included in the Qout-clone information. However, such determination can not be made if the sync point processing is performed each time a plurality of transaction data items, say three items, are processed. Therefore, in this invention, control information (TRX information) for registering, for each task, a key value which indicates one of the transaction data currently being processed is held in a storage (common area of MVS, for example) rather than a database so as to exclude from the sync point processing, and the following processing is performed (see FIG. 5).

Figure 5:
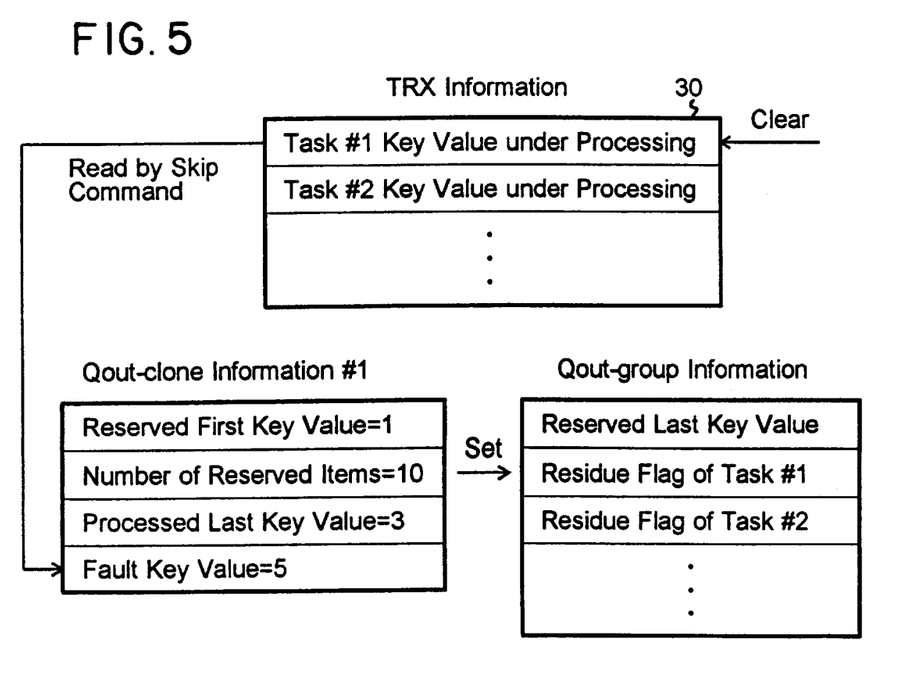
FIG. 5 is a diagram showing the operation for skipping processing of transaction data which caused a fault in the parallel transaction processing system according to this invention.

When each task starts to process one item of the transaction data, it writes its key value to the TRX information 30. When transaction data processing is normally completed, a corresponding key value of the TRX information is cleared and, if a sync point processing is then needed, the processed key value is written in the Qout-clone information. This process is repeated for each transaction data processing.

When a fault occurs during processing of transaction data by, for example, the task #1, a key value under processing of the task #1 in the TRX information 30 remains uncleared. Also, a key value of transaction data for which the last sync point processing was performed (3 in the example of FIG. 5) is then set in the Qout-clone information #1. When the user enters the above described skip command in this situation (the user is normally informed of the occurrence of a fault in the conventional transaction processing system), the key value under processing of the fault causing task #1 is retrieved from the TRX information and written in the Qout-clone information of that task as a fault key value (5 in the example of FIG. 5) which should not be processed. Further, the residue flag of the fault causing task #1 is set in the Qout-group information (as described above, when a fault occurs, no residue flag is set even if any unprocessed transaction data remain), a sync point processing is performed and the key value under processing of the task #1 is cleared.

If a task, e.g. task #2 initiates the allocation processing in this situation, the operations described with reference to FIGS. 3 and 4 would be performed. In this case, however, the key value, 5, of the transaction data which was being processed at the time when the fault occurred is set in the Qout-clone information #1 of the task, i.e. fault causing task whose residue flag is on so that the task #2 retrieves the transaction data indicated by this fault key value 5 from the queue 10, writes it in a separate error information queue, and sets the fault key value to a value indicating "processed" (e.g. 0). Processing is resumed at a key value (4, in the example of FIG. 5) next to the last key value written in the Qout-clone information in the last sync point processing and proceeds to further transaction data without processing the transaction data of the fault key value 5.

Figure 6:
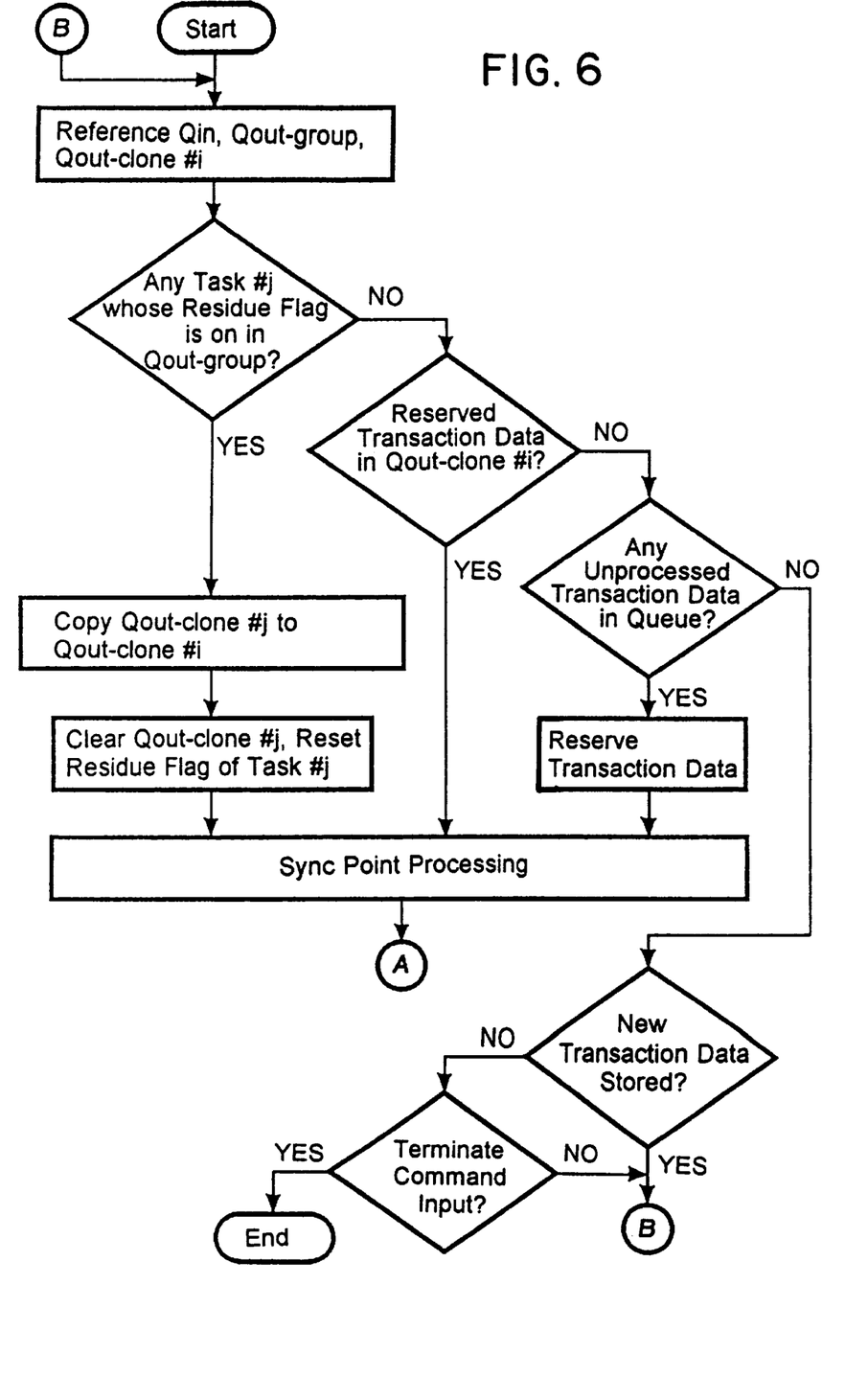
FIG. 6 is a part of a flowchart showing the operation of the parallel transaction processing system according to this invention.
Figure 7:
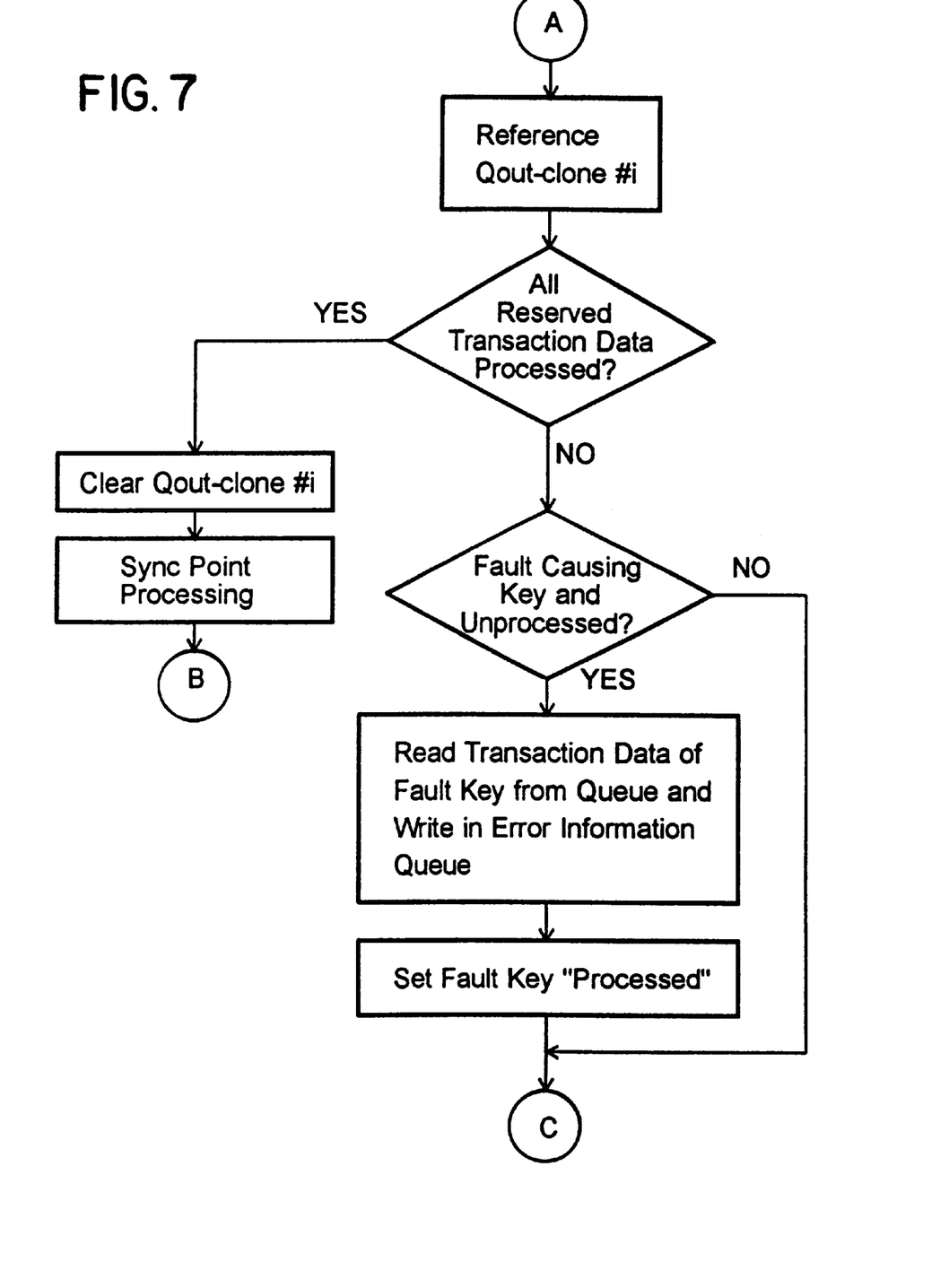
FIG. 7 is a part of the flowchart showing the operation of the parallel transaction processing system according to this invention.
Figure 8:
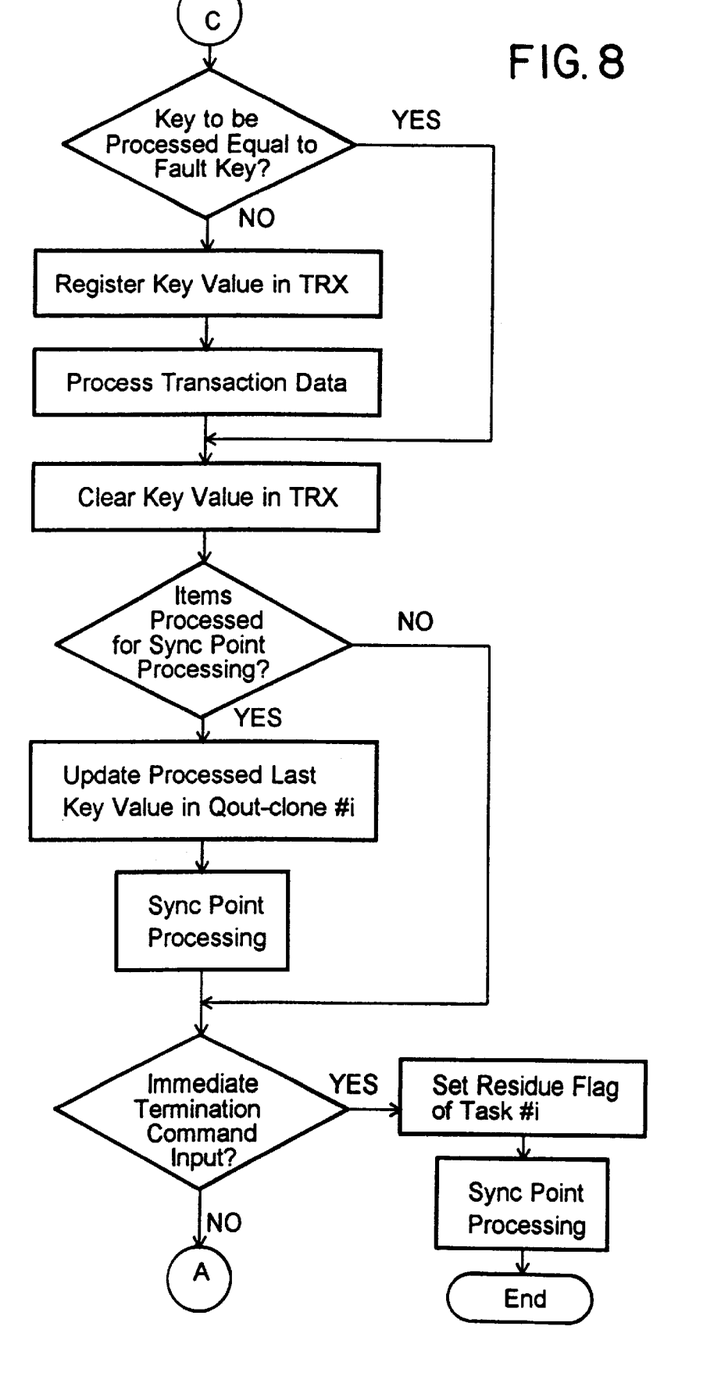
FIG. 8 is a part of the flowchart showing the operation of the parallel transaction processing system according to this invention.

Finally, the flow of the transaction data processing according to this invention is summarized in the flowchart shown in FIG. 6 to FIG. 8. This flowchart shows a flow from a point where task #i starts allocation to a task termination. In the figures, task #j is a task whose residue flag is on. Explanation of the flowchart is omitted since it is a duplicate of what has been so far explained.

The above configuration may be implemented only by software so that parallel transaction data processing independent of hardware configuration is available according to this invention. Further, when the present system is operated in a sysplex environment, parallel transaction processing across CECs is realized simply by sharing the database of the queue and control table without requiring a special component such as XES. Further, according to this invention, processing of illegal transaction data can be readily avoided which was impossible in the prior art.

While the preferred embodiments of this invention have been described, it should be understood that this invention is not limited thereto and various modifications are possible within the scope of the technological concept of this invention as set forth in the claims.

What is claimed is:

1. A parallel transaction processing system, comprising:
    a queue for storing a plurality of transaction data which can be processed independently;
    a control table containing control information for said queue; and
    means for operating a plurality of tasks each of which performs the same processing on said transaction data, wherein each of said plurality of tasks reserves, by referencing said control table, a predetermined number of consecutive transaction data for processing among unprocessed transaction data stored in said queue, writes its reservation status in said control table and, upon having processed the reserved transaction data, writes its processing status in said control table.

2. The parallel transaction processing system of claim 1 in which said queue identifies the transaction data by serially numbered unique key values.

3. The parallel transaction processing system of claim 2 in which said control table holds first information indicating up to which point the transaction data are stored in said queue, second information indicating up to which one of the plurality of transaction data stored in said queue have been reserved for processing, and third information indicating the reservation and processing statuses of each task.

4. The parallel transaction processing system of claim 3 further comprising:

means for immediately terminating a task; and means operative when any transaction data reserved by the immediately terminated task remains unprocessed, for setting a flag indicating it in said second control information.

5. The parallel transaction processing system of claim 3 further comprising:

means for holding separately from said control table a key value under processing indicating transaction data currently being processed by each task; and means for writing a key value under processing of a task which has caused a fault in said third control information corresponding to said task as a fault key value, whereby processing of the transaction data indicated by said fault key value is avoided.

6. The parallel transaction processing method, comprising the steps of:

storing a plurality of transaction data which can be processed independently;

providing a control table containing control information for said queue; and operating a plurality of tasks each of which performs the same processing on said transaction data, whereby each of said plurality of tasks reserves, by referencing said control table, a predetermined number of consecutive transaction data for processing among unprocessed transaction data stored in said queue, writes its reservation status in said control table, and upon having processed the reserved transaction data, writes its processing status in said control table.

7. The parallel transaction processing method of claim 6 in which said queue identifies the transaction data by serially numbered unique key values.

8. The parallel transaction processing method of claim 7 in which said control table holds first information indicating up to which point the transaction data are stored in said queue, second information indicating up to which one of the plurality of transaction data stored in said queue data have been reserved for processing, and third information indicating the reservation and processing statuses of each task.

9. The parallel transaction processing method of claim 8 further comprising the steps of:

immediately terminating a task; and setting, when any transaction data reserved by the immediately terminated task remains unprocessed, a flag indicating it in said second control information.

10. The parallel transaction processing method of claim 8 further comprising the steps of:

holding separately from said control table a key value under processing indicating transaction data currently being processed by each task; and writing a key value under processing of a task which has caused a fault in said third control information corresponding to said task as a fault key value, whereby processing of the transaction data indicated by said fault key value is avoided.

* * * * *